United States Patent
Sowersby

(10) Patent No.: US 10,113,044 B2
(45) Date of Patent: Oct. 30, 2018

(54) METHODS OF PROCESSING LATEX, METHODS OF MAKING CARPET, AND CARPETS

(71) Applicant: SST Foam, LLC, Brookhaven, GA (US)

(72) Inventor: James Allen Sowersby, Brookhaven, GA (US)

(73) Assignee: SST Foam, LLC, Alpharetta, GA (US)

( * ) Notice: Subject to any disclaimer, the term of this patent is extended or adjusted under 35 U.S.C. 154(b) by 0 days.

(21) Appl. No.: 15/405,840

(22) Filed: Jan. 13, 2017

(65) Prior Publication Data

US 2018/0201748 A1    Jul. 19, 2018

(51) Int. Cl.
| | |
|---|---|
| *B32B 37/12* | (2006.01) |
| *C08J 9/08* | (2006.01) |
| *B32B 7/12* | (2006.01) |
| *B32B 5/02* | (2006.01) |

(52) U.S. Cl.
CPC .................. *C08J 9/08* (2013.01); *B32B 5/02* (2013.01); *B32B 7/12* (2013.01); *B32B 37/12* (2013.01); *B32B 2471/02* (2013.01); *C08J 2201/03* (2013.01); *C08J 2203/02* (2013.01); *C08J 2307/02* (2013.01)

(58) Field of Classification Search
CPC .................................. B32B 37/12; B32B 5/00
See application file for complete search history.

(56) References Cited

U.S. PATENT DOCUMENTS

| | | | | |
|---|---|---|---|---|
| 3,968,285 | A * | 7/1976 | Coffin | C08J 9/30 428/95 |
| 2008/0160203 | A1* | 7/2008 | O'Leary | C08J 9/12 427/427.4 |
| 2010/0189907 | A1* | 7/2010 | Sikorski | D06N 3/0056 427/427.4 |

* cited by examiner

*Primary Examiner* — Daniel H Lee
(74) *Attorney, Agent, or Firm* — Eversheds Sutherland (US) LLP

(57) ABSTRACT

Methods are provided for processing a latex stream that include adding an isocyanate to a foam head that converts the latex stream to a foamed latex stream. A curing agent also may be added to the foam head. Also provided are methods of making a carpet that include disposing a foamed latex stream that includes an isocyanate onto a carpet fabric, or a support material to form a carpet backing. Carpets made by the methods herein also are provided.

18 Claims, 3 Drawing Sheets

METHODS OF PROCESSING LATEX, METHODS OF MAKING CARPET, AND CARPETS

BACKGROUND

The use of latex as a carpet backing or as part of a carpet backing is well-known in the art. It has been estimated that the amount of foamed latex used for this purpose exceeds 3 billion pounds per year. In order to reduce the cost of producing carpets having a backing that is or includes latex, a filler may be used. A commonly used filler for this purpose is calcium carbonate ($CaCO_3$).

Typically, however, increasing the amount of filler that is used may undermine one or more beneficial properties of the latex, such as the physical integrity of the latex.

Therefore, methods of processing latex that permit the use of a greater amount of filler without substantially affecting the properties of the latex are desired. Also desired are methods of processing latex that improve one or more properties, such as strength, of the latex, regardless of whether a filler is used with the latex.

BRIEF SUMMARY

Provided herein are methods of processing a latex stream. In embodiments, the methods include forwarding a latex stream to a reservoir of a foam head; disposing an isocyanate into the reservoir of the foam head to form a foamed latex stream comprising the isocyanate; and forwarding the foamed latex stream comprising the isocyanate from the reservoir of the foam head to a coating line. A curing agent also may be disposed in the reservoir of the foam head.

Also provided herein are methods of making carpets. In embodiments, the methods include forwarding a latex stream to a reservoir of a foam head; disposing an isocyanate into the reservoir of the foam head to form a foamed latex stream comprising the isocyanate; forwarding the foamed latex stream comprising the isocyanate from the reservoir of the foam head to a coating line; and disposing the foamed latex stream comprising the isocyanate on a carpet fabric to form a carpet, or a supporting material to form a carpet backing. The carpet backing then may be associated with a carpet fabric. In other embodiments, the methods include disposing a foamed latex stream comprising an isocyanate on a carpet fabric to form a carpet, or a supporting material to form a carpet backing, wherein the foamed latex stream comprises (i) the isocyanate at a concentration of about 0.5 to about 2.25%, by weight of the latex stream, and (ii) water in an amount of about 25 to about 33% by weight. The carpet backing then may be associated with a carpet fabric. The foamed latex stream may also include ammonium acetate.

Also provided herein are carpets made according to the methods herein.

DETAILED DESCRIPTION

Figure 1:
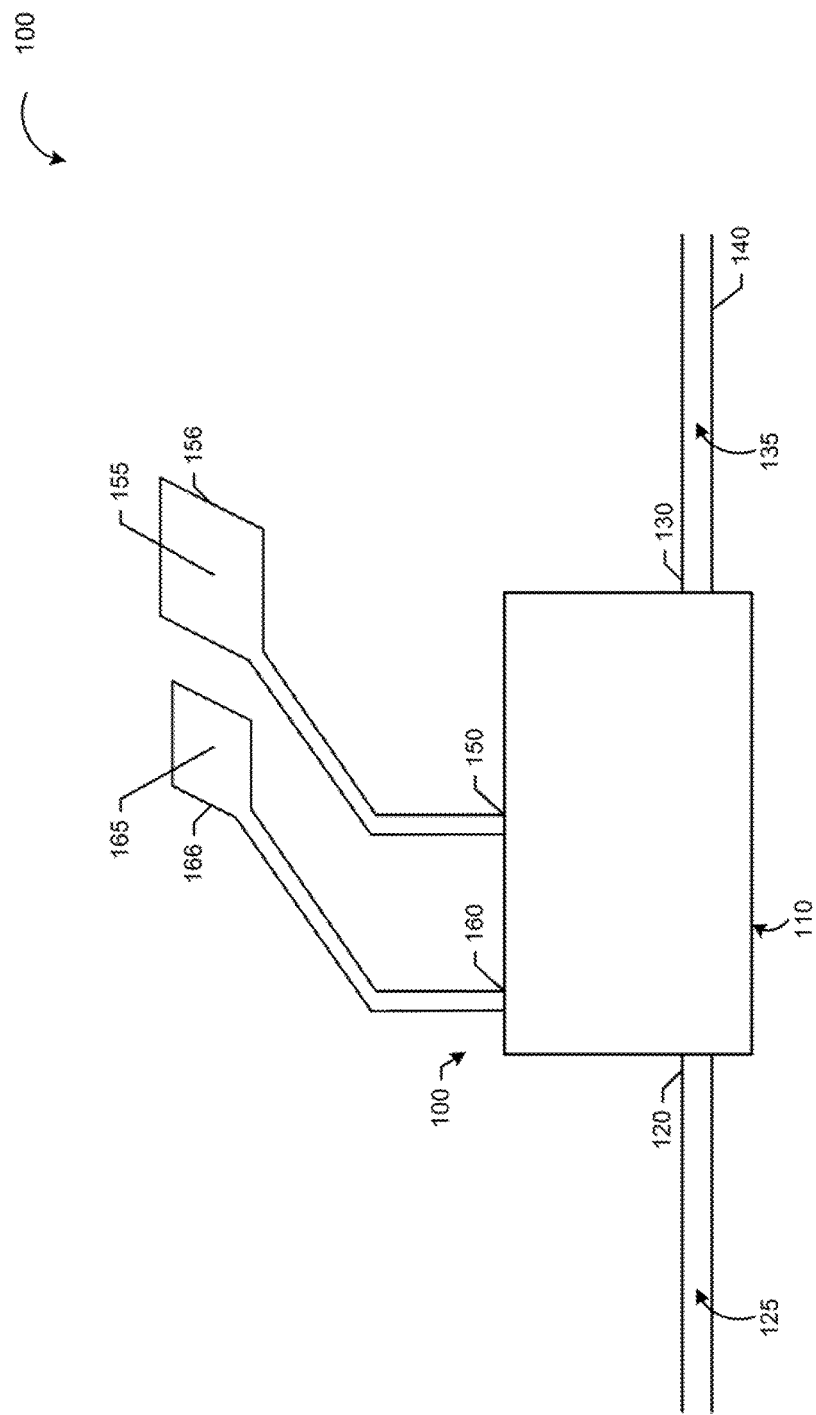
FIG. 1 is a schematic of one embodiment of a foam head that includes several inlets and an outlet for processing a latex stream.

Provided herein are methods of processing latex that allow, at least in some embodiments, the use of a greater amount of filler while at least substantially maintaining the properties of the product. Also provided herein are methods of processing latex that produce, at least in certain embodiments, a filler-containing or filler-free product that has improved properties, such as strength. Therefore, the methods provided herein may be used to [1] make a product having improved properties, and the product may or may not include a filler, and/or [2] make a filler-containing product having properties that are at least substantially the same or better than a comparable product that includes less filler.

Methods of Processing a Latex Stream

Methods of processing a latex stream are provided herein. In embodiments, the methods include forwarding the latex stream to a reservoir of a foam head; disposing an isocyanate into the reservoir of the foam head to form a foamed latex stream comprising the isocyanate; and forwarding the foamed latex stream comprising the isocyanate from the reservoir of the foam head to a coating line.

The latex stream may be forwarded to the reservoir of the foam head by any means known in the art. The latex stream, for example, may be pumped from a holding tank or other processing equipment to the reservoir of the foam head. The latex stream may be forwarded continuously or intermittently to the reservoir. The reservoir of the foam head may include an inlet that permits the entry of the latex stream into the reservoir.

The reservoir also may include an inlet that permits the isocyanate to be disposed in the reservoir. The isocyanate may be added continuously or intermittently to the reservoir. For example, a peristaltic pump may be used to dispose the isocyanate dropwise into the reservoir. As a further example, a gear pump may be used to add the isocyanate continuously to the reservoir. When disposed into the reservoir, the isocyanate may contact a portion of the latex stream that (i) has already been converted to a foam, (ii) is in the process of being converted to a foam, or (iii) a combination thereof. Therefore, the phrase "disposing an isocyanate into the reservoir of the foam head to form a foamed latex stream comprising the isocyanate" should not be construed in a manner that requires the isocyanate to contact only a portion of the latex stream that has already been converted to a foam; instead, this phrase is intended to convey that the stream exiting the foam head is a foamed latex stream comprising isocyanate due to the disposing of the isocyanate in the reservoir. The amount of isocyanate disposed in the reservoir may be an amount effective to impart the latex stream with a desired concentration of the isocyanate. This amount may be adjusted based on the characteristics of the latex stream, the foamed latex stream, the foam head, the type or types of isocyanate used, and/or one or more other factors.

In embodiments, the methods provided herein include disposing a curing agent into the reservoir of the foam head. The reservoir of the foam head may include an inlet to accommodate disposing the curing agent into the reservoir. In one embodiment, the reservoir of the foam head includes an inlet for the forwarding of the latex stream to the reservoir, an inlet for disposing the isocyanate into the reservoir, an inlet for disposing the curing agent into the reservoir, and the inlet for disposing the curing agent into the reservoir is located at a position that is closer to the inlet for the forwarding of the latex stream than the inlet for disposing the isocyanate into the reservoir. Alternatively, the curing agent may be disposed in the reservoir using the inlet through which the isocyanate is added to the reservoir. The curing agent and isocyanate may be combined or added separately when disposed into the reservoir of the foam head through the same inlet. The curing agent may include ammonium acetate, any other curing agents known in the art, or a combination thereof.

One embodiment of a foam head 100 is depicted at FIG. 1. The foam head 100 of FIG. 1 includes a reservoir 110 having a tubular structure. A first end of the reservoir 110 includes an inlet 120 through which a latex stream 125 enters the reservoir 110. A second end of the reservoir 110 includes an outlet 130 through which a foamed latex stream 135 exits the reservoir 110 and enters a coating line 140. The reservoir 110 also includes [1] an inlet 150 through which an isocyanate 155 is disposed into the reservoir 110, and [2] an inlet 160 through which a curing agent 165 is disposed into the reservoir. The isocyanate 155 and curing agent 165 are kept in holding tanks (156, 166).

In embodiments, the methods provided herein include forwarding the foamed latex stream comprising the isocyanate from the reservoir of the foam head to a coating line. The coating line may deposit a "puddle" of the foamed latex stream comprising the isocyanate adjacent to a doctor blade, air blade, or other apparatus, which may at least partially control the disposal of the foamed latex stream to a carpet fabric or a supporting material. The dimensions of the coating line may correspond to the size, such as the width, of the material to which the foamed latex stream comprising an isocyanate is to be applied. For example, when a foamed latex stream comprising an isocyanate is applied to a carpet fabric or support material having a width of about 6 to about 15 feet, the coating line and/or discharging device associated with the coating line may also have a width of about 6 to about 15 feet.

Foam Head

As used herein, the phrase "foam head" generally refers to an apparatus that converts a latex stream into a foamed latex stream. The foamed latex stream may be formed by frothing the latex stream in the foam head.

The foam head generally comprises a reservoir through which a latex stream passes. The reservoir may be tubular in shape. A tubular reservoir, for example, may have the shape of a hollow cylinder, with one end having an inlet to accommodate a latex stream, and the other end having an outlet to permit the passage of a foamed latex stream. In one embodiment, the reservoir is a tubular reservoir having a length of about 12 to about 18 inches. The diameter of the reservoir of the foam head may be about 9.9 to about 17.9 inches, and the diameter of the foam head may be about 10 to about 18 inches. The phrase "diameter of the reservoir of the foam" head refers to the inner diameter of the reservoir, and the "diameter of the foam head" refers to the outer diameter of the device.

The reservoir of the foam head also may include an inlet to accommodate disposing an isocyanate into the reservoir. Generally, this inlet may be located at any position, so long as the isocyanate is capable of entering the reservoir. In embodiments, the reservoir of the foam head includes an inlet at a first end to accommodate a latex stream, an outlet at a second end to permit the passage of a foamed latex stream out of the reservoir, the distance between the ends of the reservoir is X, and the inlet for disposing an isocyanate into the reservoir is located at a position that is a distance of about 0.3X to about 0.7X from the end of the reservoir having the latex stream inlet, about 0.4X to about 0.6X from the end of the reservoir having the latex stream inlet, or about 0.5X from the end of the reservoir having the latex stream inlet. For example, the reservoir may be a tubular reservoir, wherein X is 18 inches, and the inlet for disposing the isocyanate into the reservoir is located about 5.4 to about 12.6 inches, about 7.2 to about 10.8 inches, or about 9 inches from the end of the tubular cylinder that includes the latex stream inlet.

The reservoir of the foam head also may include an inlet to accommodate disposing a curing agent into the reservoir. Generally, this inlet may be located at any position, so long as the curing agent is capable of entering the reservoir. In one embodiment, the inlet for disposing a curing agent into the reservoir is located closer to the latex stream inlet than the inlet for disposing an isocyanate into the reservoir. In other words, the distance between the latex stream inlet and the curing agent inlet is less than the distance between the latex stream inlet and the isocyanate inlet. In embodiments, the reservoir of the foam head includes an inlet at a first end to accommodate a latex stream, an outlet at a second end to permit the passage of a foamed latex stream out of the reservoir, the distance between the ends of the reservoir is X, and the inlet for disposing a curing agent into the reservoir is located at a position that is a distance of about 0.1X to about 0.6X from the end of the reservoir having the latex stream inlet, about 0.1X to about 0.4X from the end of the reservoir having the latex stream inlet, or about 0.25X from the end of the reservoir having the latex stream inlet. For example, the reservoir may be a tubular reservoir, wherein X is 18 inches, and the inlet for disposing the curing agent into the reservoir is located about 1.8 to about 10.8 inches, about 1.8 to about 7.2 inches, or about 4.5 inches from the end of the tubular cylinder that includes the latex stream inlet.

In one embodiment, the latex stream is forwarded continuously to the reservoir of the foam head. The flow rate of the latex stream through the reservoir may be about 200 to about 1100 kg/hour, about 300 to about 1100 kg/hour, about 400 to about 1000 kg/hour, about 500 to about 1000 kg/hour, about 600 to about 1000 kg/hour, about 600 to about 900 kg/hour, or about 700 kg/hour to about 900 kg/hour.

The pressure in the reservoir may be greater than atmospheric pressure. For example, the pressure in the reservoir may be at least 1.1 atm. In embodiments, the pressure in the reservoir is about 1.1 atm to about 6 atm, about 2 atm to about 6 atm, about 3 to about 6 atm, or about 3 to about 5 atm.

The foam head also may include a rotating shaft. The rotating shaft may be positioned in the reservoir. The reservoir, for example, may be a tubular reservoir, and the rotating shaft may be arranged in the reservoir. The rotating shaft may be centered in the reservoir. The rotating shaft may have a length that is at least substantially equal to the length of the reservoir, greater than the length of the reservoir, or less than the length of the reservoir. The rotating shaft may include a series of protrusions that may assist in the frothing of the latex stream. In one embodiment, the inner surface of the reservoir, such as a tubular reservoir, also includes protrusions that may assist in the frothing of the latex stream to form a foamed latex stream. When both the inner surface of the reservoir and the rotating shaft include protrusions, the protrusions of the inner surface of the reservoir and the protrusions of the rotating shaft may be offset to avoid contact. The rotating shaft may be rotate at about 50 to about 300 rpm, about 100 to about 250 rpm, about 100 to about 200 rpm, or about 150 to about 250 rpm. The protrusions of the rotating shaft and/or the inner surface of the reservoir may be uniformly shaped, or include a plurality of different shapes. The protrusions may have a shape that is triangular, square, semi-circular, polygonal, or the like. The protrusions also may be uniformly or randomly dispersed along the rotating shaft and/or the inner surface of the reservoir.

Figure 2:
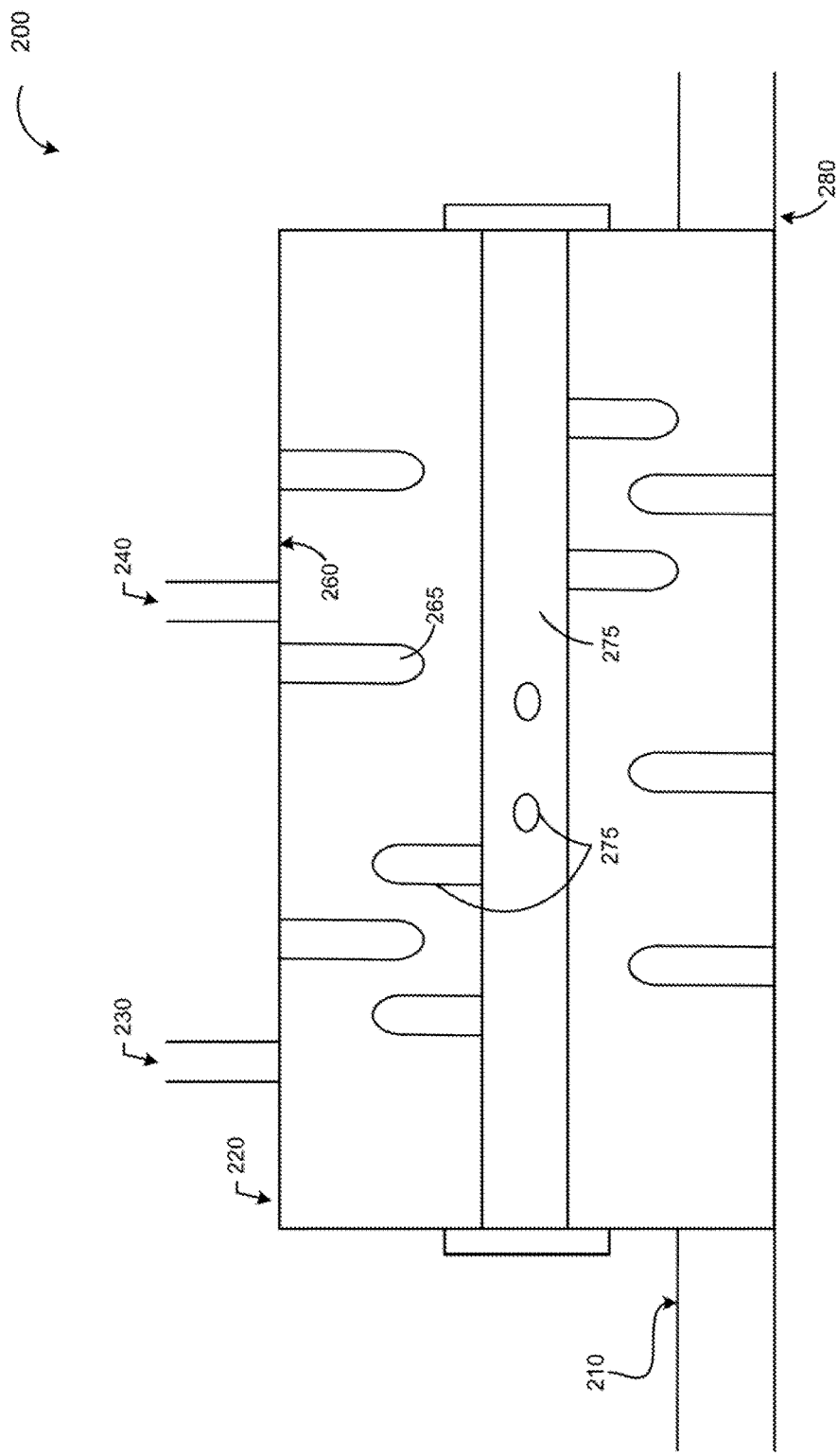
FIG. 2 is a schematic of the internal parts of the embodiment of the foam head depicted at FIG. 1.

One embodiment of a foam head is depicted at FIG. 2, which is a schematic of the internal parts of the foam head of FIG. 1. The foam head 200 includes an inlet 210 through which the latex stream is forwarded into the reservoir 220, which is tubular in shape. The foam head 200 also includes an inlet 230 for disposing a curing agent to the reservoir 220, and an inlet 240 for disposing an isocyanate into the reservoir 220. The inner surface 260 of the reservoir includes a series of protrusions 265 that are offset with the protrusions 275 of the rotating shaft 270. The foam head 200 also includes an outlet 280 through which the foamed latex stream exits the reservoir 220.

In embodiments, the flow rate of the latex stream through the reservoir is about 200 to about 1100 kg/hour, the pressure in the reservoir is about 1.1 atm to about 6 atm, and the rotating shaft rotates at about 50 to about 300 rpm.

In embodiments, the flow rate of the latex stream through the reservoir is about 300 to about 1100 kg/hour, the pressure in the reservoir is about 2 atm to about 6 atm, and the rotating shaft rotates at about 100 to about 250 rpm.

Latex Stream

The latex stream of the methods provided herein may include a natural latex, a carboxylated styrene butadiene copolymer latex admixture (SBR latex), or a combination thereof.

The latex stream typically includes particles of at least one type of latex solid and water. The latex stream also may include a pre-mixed latex stream that includes particles of at least one type of latex solid, water, an original curing agent, and an original filler. The original filler, which may be calcium carbonate, may be present in the latex stream in an amount of about 200 parts per 100 parts of latex solid to about 650 parts per 100 parts of latex solid. The original curing agent may be present in the latex stream in an amount of about 1 to about 5% by weight, or about 3%, by weight. The particles and/or original filler may be suspended in the water. The suspension may be a substantially uniform suspension. The particles can include particles of a single type of latex solid or particles of two or more types of latex solid.

The latex stream also may include a filler, including any of those known in the art, such as calcium carbonate. The term "filler," as used herein, refers to filler added to the latex stream, including the latex streams that include an original filler. Therefore, a filler can be present in the latex stream in addition to an original filler. The latex stream can include a filler in an amount of about 5 to about 25%, by weight of the latex stream, about 10 to about 20%, by weight of the latex stream, about 10%, by weight of the latex stream, or about 12%, by weight of the latex stream. The phrase "by weight of the latex stream" means that the amount of the component, such as a filler or isocyanate, that is present or added is equal to the indicated percentage of the total weight of the latex stream prior to the addition of the component, and the latex stream may include (i) particles of at least one type of latex solid, (ii) water, (iii) an original filler, (4) a curing agent, or (5) any combination thereof. For example, if a sample of the latex stream consists of water, particles of at least one type of latex solid, and an original filler, and the sample weighs 100 g, then 5 g to 25 g of a filler would be added to the 100 g sample of the latex stream in order for the filler to be present in an amount of about 5 to about 25%, by weight of the latex stream.

The concentration of water in the latex stream may be at least 25%, at least 25.5%, or at least 26%, by weight. In one embodiment, the concentration of water in the latex stream is about 25 to about 33%, by weight. In another embodiment, the concentration of water in the latex stream is about 26 to about 33%, by weight. In a further embodiment, the concentration of water in the latex stream is about 27 to about 33%, by weight. In yet another embodiment, the concentration of water in the latex stream is about 28 to about 33%, by weight. In a still further embodiment, the concentration of water in the latex stream is about 29 to about 33%, by weight. In a certain embodiment, the concentration of water in the latex stream is about 30 to about 33%, by weight. In contrast to the phrase "by weight of the latex stream," the phrase "by weight," as used herein, means that the component, such as water, contributes to the total weight of the latex stream at the weight percentage indicated. For example, if a sample of the latex stream weighs 100 g, and the concentration of water in the latex stream is about 30% "by weight," then the latex stream includes 30 g of water, and 70 g of other components.

The particles of at least one type of latex solid of the latex streams provided herein may include particles of a natural rubber, a natural rubber which has been substituted with functional groups, a synthetic rubber, or a combination thereof. Examples of synthetic rubbers include, but are not limited to, styrene butadiene rubber (SBR). Other suitable types of latex solids, which may be used alone in combination with the other latex solids disclosed herein, include those formed from acrylic copolymers, including elastomeric and/or non-elastomeric copolymers, and non-elastomeric materials, such as poly(vinyl acetate) and copolymers of vinyl acetate.

The acrylic copolymer may be a copolymer of a lower alkyl ester of acrylic acid with a lower alkyl ester of methacrylic acid, such as copolymers of ethyl acrylate and methyl methacrylate. Also suitable are copolymers of one or other or both of a lower alkyl ester of acrylic acid and a lower alkyl ester of methacrylic acid with a further monomer chosen from vinyl acetate, styrene, acrylonitrile, or a combination thereof. The alkyl chains of the lower alkyl esters of acrylic acid and methacrylic acid, in embodiments, may have from one to four carbon atoms.

The copolymers of vinyl acetate may be those formed by copolymerising vinyl acetate with a copolymerising monomer chosen from a lower alkyl ester of acrylic acid, a lower alkyl ester of methacrylic acid, styrene, acrylonitrile, or a combination thereof.

The latex stream may include a stabilizer. Non-limiting examples of a stabilizer include a surfactant, a water-soluble colloid, and combinations thereof.

Isocyanate

The isocyanate disposed in the reservoir of the foam head may be a neat isocyanate, or the isocyanate may be combined with one or more other materials, such as a diluent or carrier.

The isocyanate may include a diisocyanate, such as methylene diphenyl diisocyanate (MDI), toluene diisocyanate (TDI), isophorone diisocyanate, or a combination thereof.

The concentration of isocyanate in the foamed latex stream may be about 0.5 to about 2.25%, by weight of the latex stream, about 1.5 to about 1.7%, by weight of the latex stream, about 1.5%, by weight of the latex stream, or about 1.7%, by weight of the latex stream.

In embodiments, the isocyanate disposed in the reservoir of the foam head is a neat isocyanate selected from MDI, TDI, isophorone diisocyanate, or a combination thereof, and the concentration of the isocyanate in the foamed latex stream is about 0.5 to about 2.25%, by weight of the latex stream, about 1.5 to about 1.7%, by weight of the latex stream, about 1.5%, by weight of the latex stream, or about 1.7%, by weight of the latex stream.

Curing Agent

In the methods provided herein, a curing agent may be disposed in the reservoir in addition to an isocyanate. The phrase "curing agent," as used herein, refers to a curing agent disposed in the reservoir to be added to the latex stream, including the latex streams that include an original curing agent. Therefore, a curing agent can be present in the latex stream in addition to an original curing agent. The original curing agent and the curing agent may be different.

Generally, any curing agent may be used that facilitates reaction between and among the particles of one or more latex solids, the isocyanate, water, or a combination thereof. The curing agent disposed into the reservoir of the foam head may be a neat curing agent, or the curing agent may be combined with one or more other materials, such as a diluent or carrier. For example, the curing agent may be diluted with water; in some instances, the weight ratio of water to curing agent is about 10:90 to about 90:10.

In one embodiment, the curing agent includes ammonium acetate, ammonium calcitrate, or a combination thereof.

The curing agent may be added at any rate and in any amount to achieve a desired effect. In one embodiment, the curing agent is disposed in the reservoir at an amount and/or rate sufficient to impart the latex stream comprising an isocyanate with a concentration of curing agent of about 1 to about 4%, by weight of the latex stream, about 1.75 to about 3.5%, by weight of the latex stream, or about 2.5 to about 3.0%, by weight of the latex stream.

In one embodiment, the curing agent comprises ammonium acetate or ammonium acetate and water, and the curing agent is disposed in the reservoir at an amount and/or rate sufficient to impart the latex stream comprising an isocyanate with a concentration of curing agent of about 1 to about 4%, by weight of the latex stream, about 1.75 to about 3.5%, by weight of the latex stream, or about 2.5 to about 3.0%, by weight of the latex stream.

Carpet

Also provided herein are carpets and methods of making a carpet, and a carpet made according to the methods herein. The carpets made by the methods provided herein can include any carpets known in the art, including "wall-to-wall" carpets, carpet tiles, and bath mats.

In embodiments, the methods of making a carpet comprise disposing a foamed latex stream comprising an isocyanate, as provided herein, on a carpet fabric to form a carpet. In further embodiments, the methods of making a carpet comprise disposing a foamed latex stream comprising the isocyanate, as provided herein, on a supporting material to form a carpet backing. If the foamed latex stream is disposed on a supporting material to form a carpet backing, then the carpet backing may be associated with a carpet fabric to form a carpet. The carpet backing and the carpet fabric may be associated with each other by any means known in the art. For example, an adhesive may be used to associate the carpet backing and the carpet fabric.

Disposing a foamed latex stream comprising the isocyanate onto a carpet fabric or supporting material may be achieved by any means known in the art. For example, a doctor blade may be used to assist the disposal of the foamed latex stream onto the carpet fabric or supporting material. When a doctor blade is used, a foamed latex stream comprising an isocyanate may be discharged from a coating line in an amount effective to form a "puddle" behind the doctor blade. Air blades also may be used.

Figure 3:
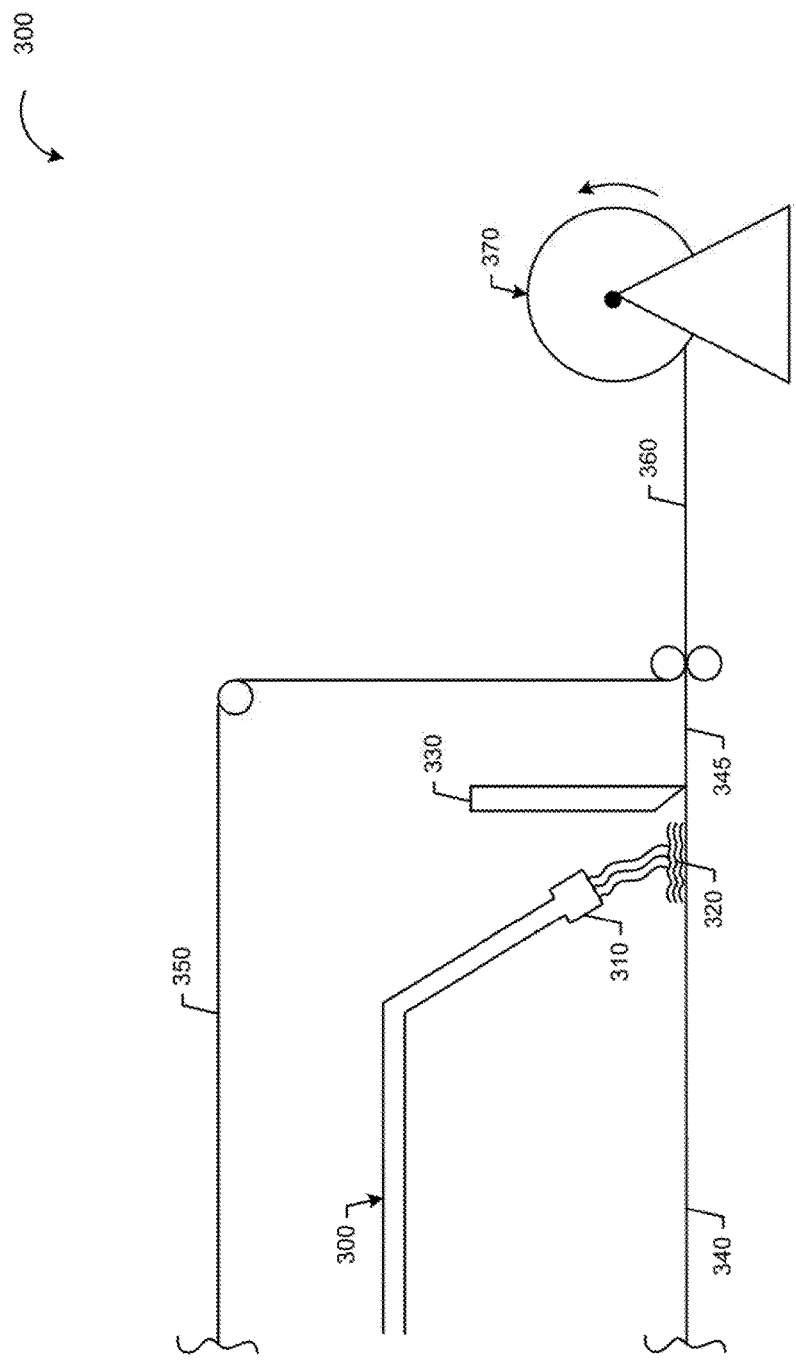
FIG. 3 is a schematic depicting one embodiment of a doctor blade.

One embodiment of a doctor blade 330 is depicted at FIG. 3. A coating line 300 delivers a foamed latex stream comprising an isocyanate through a discharging device 310 in an amount sufficient to form a "puddle" 320 of the foamed latex stream comprising an isocyanate behind the doctor blade 330. The doctor blade 330 is arranged and designed to apply a coating of the foamed latex of a desired thickness to a supporting material 340 to form a carpet backing 345 as the supporting material 340 passes under the doctor blade 330. The carpet backing 345 is then associated with a carpet fabric 350 to form a carpet 360 that may be collected on a roll 370. In some instances, the coating line 300 of FIG. 3 may correspond to the coating line 140 of FIG. 1. It also must be noted that FIG. 1 and FIG. 3 are schematics, and other processing steps and/or apparatuses known in the art may be incorporated.

When disposing a foamed latex stream comprising an isocyanate on a supporting material or carpet fabric, the foamed latex stream comprising an isocyanate may be disposed continuously on the supporting material or carpet fabric. The supporting material or carpet fabric may be advanced in such a process at a rate of about 5 to about 50 feet per minute.

In embodiments, the methods herein include a method of making a carpet that includes disposing a foamed latex stream comprising an isocyanate on a supporting material to form a carpet backing; and associating the carpet backing with a carpet fabric; wherein the foamed latex stream comprises (i) the isocyanate at a concentration of about 0.5 to about 2.25%, by weight of the latex stream, and (ii) water in an amount of about 25 to about 33% by weight. The foamed latex stream may include ammonium acetate.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1

Foamed Latex Stream Comprising an Isocyanate

A natural rubber latex stream that included water in an amount of about 30% by weight was pumped continuously into a foam head having the structure depicted at FIG. 2.

TABLE 1

Conditions of the Foam Head of Example 1

| Condition | Value |
|---|---|
| Pressure | 2 atm (2.0265 bar) |
| Rotating Shaft Speed | 100 rpm |
| Flow Rate of Latex Stream | 500 kg/hour |

TABLE 1-continued

Conditions of the Foam Head of Example 1

| Condition | Value |
| --- | --- |
| Addition Rate of Diisocyanate | Continuous, sufficient to impart foamed latex stream with isocyanate concentration of about 1.5 weight %, based on the weight of the latex stream. |
| Addition Rate of Ammonium Acetate (Curing Agent) | Continuous, sufficient to impart the foamed latex stream with ammonium acetate concentration of about 3.0 weight %, based on the weight of the latex stream. |

Three diisocyanates were tested in this example: (1) methylene diphenyl diisocyanate (MDI), (2) toluene diisocyanate (TDI), and (3) isophorone diisocyanate.

For each of the three diisocyanates, two foamed latex streams were formed. The first stream included a filler, calcium carbonate, in an amount of about 10% by weight of the latex stream, and the second steam included a filler, calcium carbonate, in an amount of about 20% by weight of the latex stream. The latex stream also included an original filler. The physical characteristics of the foamed latexes were compared to similar products that did not include a diisocyanate.

The data revealed that the product of the foamed latex streams that included the filler in an amount of 20% by weight of the latex stream and one of the diisocyanates, and the product of the foamed latex stream that included filler in an amount of 10% by weight of the latex stream and no diisocyanate had substantially the same strength. Therefore, the methods provided herein may permit latex usage to be reduced by 10% without undermining the physical characteristics of the product.

A third sample having physical characteristics substantially equivalent to the foregoing samples of this example were created by including (i) filler in an amount of 12% by weight of the latex stream, (ii) one of each of the three diisocyanates in an amount of 1.6% by weight of the latex stream, and otherwise adhering to the parameters of Table 1.

I claim:

1. A method of processing a latex stream, the method comprising:
    forwarding the latex stream to a reservoir of a foam head;
    disposing an isocyanate into the reservoir of the foam head to form a foamed latex stream comprising the isocyanate; and
    forwarding the foamed latex stream comprising the isocyanate from the reservoir of the foam head to a coating line;
    wherein the concentration of the isocyanate in the foamed latex stream is about 0.5 to about 2.25%, by weight of the latex stream.

2. The method of claim 1, further comprising disposing a curing agent into the reservoir of the foam head.

3. The method of claim 2, wherein the curing agent comprises ammonium acetate.

4. The method of claim 2, wherein the reservoir of the foam head comprises an inlet for the forwarding of the latex stream to the reservoir, an inlet for disposing the isocyanate into the reservoir, an inlet for disposing the curing agent into the reservoir, and the inlet for disposing the curing agent into the reservoir is located at a position that is closer to the inlet for the forwarding of the latex stream to the reservoir than the inlet for disposing the isocyanate into the reservoir.

5. The method of claim 1, wherein the latex stream comprises particles of at least one type of latex solid and water.

6. The method of claim 5, wherein the particles of at least one type of latex solid comprise a natural rubber, a carboxylated styrene butadiene copolymer, or a combination thereof.

7. The method of claim 5, wherein the concentration of water in the latex stream is about 25 to about 33%, by weight.

8. The method of claim 5, wherein the concentration of water in the latex stream is about 30 to about 33%, by weight.

9. The method of claim 1, wherein the flow rate of the latex stream into the reservoir of the foam head is about 300 to about 1100 kg/hour.

10. The method of claim 1, wherein the isocyanate comprises a diisocyanate.

11. The method of claim 10, wherein the diisocyanate comprises methylene diphenyl diisocyanate (MDI), toluene diisocyanate (TDI), isophorone diisocyanate, or a combination thereof.

12. The method of claim 1, wherein the concentration of the isocyanate in the foamed latex stream is about 1.5 to about 1.7%, by weight of the latex stream.

13. The method of claim 1, wherein the reservoir of the foam head is a tubular reservoir, and the foam head further comprises a rotating shaft arranged in the tubular reservoir, and the rotating shaft rotates at a speed of about 100 to about 250 rpm.

14. The method of claim 1, wherein the pressure in the reservoir of the foam head is about 2 to about 6 atm.

15. The method of claim 1, further comprising disposing the foamed latex stream comprising the isocyanate on a carpet fabric or a supporting material.

16. A method of processing a latex stream, the method comprising:
    forwarding the latex stream to a reservoir of a foam head;
    disposing a curing agent into the reservoir of the foam head;
    disposing an isocyanate into the reservoir of the foam head to form a foamed latex stream comprising the isocyanate; and
    forwarding the foamed latex stream comprising the isocyanate from the reservoir of the foam head to a coating line;
    wherein the concentration of water in the latex stream is about 25 to about 33%, by weight,
    the isocyanate comprises methylene diphenyl diisocyanate (MDI), toluene diisocyanate (TDI), isophorone diisocyanate, or a combination thereof,
    the concentration of the isocyanate in the foamed latex stream is about 0.5 to about 2.25%, by weight of the latex stream, and the reservoir of the foam head comprises an inlet for the forwarding of the latex stream to the reservoir, an inlet for disposing the isocyanate into the reservoir, an inlet for disposing the curing agent into the reservoir, and the inlet for disposing the curing agent into the reservoir is located at a position that is closer to the inlet for the forwarding of the latex stream to the reservoir than the inlet for disposing the isocyanate into the reservoir.

17. A method of making a carpet, the method comprising:
disposing a foamed latex stream comprising an isocyanate on a supporting material to form a carpet backing; and
associating the carpet backing with a carpet fabric;
wherein the foamed latex stream comprises (i) the isocyanate at a concentration of about 0.5 to about 2.25%, by weight of the latex stream, and (ii) water in an amount of about 25 to about 33% by weight.

18. The method of claim 17, wherein the foamed latex stream further comprises ammonium acetate.

* * * * *